United States Patent [19]

Suemura

[11] Patent Number: 5,400,167

[45] Date of Patent: Mar. 21, 1995

[54] OPTICAL FREQUENCY ACQUISITION APPARATUS FOR OPTICAL COHERENT COMMUNICATION SYSTEM

[75] Inventor: Yoshihiko Suemura, Tokyo, Japan

[73] Assignee: NEC Corporation, Tokyo, Japan

[21] Appl. No.: 222,581

[22] Filed: Apr. 4, 1994

[30] Foreign Application Priority Data

Apr. 2, 1993 [JP] Japan .................................. 5-077221

[51] Int. Cl.6 ........................ H04B 9/00; H04B 10/06; H04J 14/00
[52] U.S. Cl. .................................... 359/194; 359/191
[58] Field of Search ............... 359/190, 191, 192, 180, 359/181, 187, 188, 194, 195

[56] References Cited

U.S. PATENT DOCUMENTS

| | | | |
|---|---|---|---|
| 4,903,342 | 2/1990 | Yamazaki | 455/619 |
| 4,912,527 | 3/1990 | Yamazaki | 455/619 |
| 5,046,140 | 9/1991 | Yamazaki | 359/191 |

FOREIGN PATENT DOCUMENTS 0319174 11/1988 European Pat. Off. .
0396370 4/1990 European Pat. Off. .

Primary Examiner—Herbert Goldstein
Assistant Examiner—Bhavesh Mehta
Attorney, Agent, or Firm—Ostrolenk, Faber, Gerb & Soffen

[57] ABSTRACT

An automatic frequency control system, for an optical coherent communication system, in which the frequency of local oscillation light 5 from a coherent light communication receiver 100 is swept to pull the intermediate frequency to a stable AFC point. The AFC is caused to operate with an intermediate frequency in the AFC operation range, and interrupted. Subsequently while sweeping the frequency of local oscillation light 5 in a certain direction in a predetermined range, the output voltage of frequency discriminator 9 is monitored. Once the change of the output voltage of frequency discriminator 9 due to the sweep exceeds the predetermined threshold value, the AFC resumes for pulling to a stable point.

2 Claims, 4 Drawing Sheets

OPTICAL FREQUENCY ACQUISITION APPARATUS FOR OPTICAL COHERENT COMMUNICATION SYSTEM

BACKGROUND OF THE INVENTION

The present invention relates to an optical coherent communication system, and particularly to a technique for controlling the intermediate frequency in an optical heterodyne detection system.

Optical heterodyne communication (Optical coherent communication) systems are advantageous in that a long distance, high capacity transmission is possible because reception sensitivity is much higher compared with a direct detection communication system and because it is suitable for a frequency division multiplexed system.

In an heterodyne detection system, a photo detector receives a composite signal of an input optical signal transmitted from a transmitter and a local oscillation light from a local oscillation light source included in an optical receiver thereof. As a result, a beat signal corresponding to a frequency difference therebetween appears at an output of the photo detector as an electric intermediate frequency (IF) signal. By demodulating this IF signal, a base band signal is obtained. When the relative frequency difference between the signal light and the local oscillation light is not maintained constant, fluctuation of the IF occurs, resulting in an error in the demodulated signal. Therefore in the optical heterodyne detection system, the IF frequency has to be stabilized by controlling the local oscillation light frequency.

For this IF stabilization, an automatic frequency control (AFC) technique is used. In conventional optical heterodyne receivers, for realization of AFC, an IF signal is put into a frequency discriminator with a characteristic zero-crossing at a desired IF value and the output signal from it is fed back as an injection current to a semiconductor laser working as a local oscillation light source.

Additionally, in the optical heterodyne receiver, with the same IF frequency, the frequency of the local oscillation light can be higher in some cases or lower in other cases than the frequency of the signal light. Correspondingly there are real and image bands. The characteristics of IF frequency vs. frequency discriminator output voltage utilized for AFC in the real and image bands are opposite to each other, and stable AFC points appears in both bands. A demodulated signal in the image band has poor quality as well known in the art.

The method for pull-in to a desired stable AFC point in the real band is disclosed in U.S. Pat. No. 5,046,140. This method involves sweeping the frequency of the local oscillation light while making a slight frequency modulation of local oscillation light, detecting the differential rate of the output signal voltage of a frequency discriminator using a lock-in amplifier, or the like, and deciding whether the point in is the real or image band based on the result of a positive or negative value of the differential rate.

This method however takes a long pull-in time since it needs to sweep the frequency of the local oscillation light over the whole band including both real and image bands. This long pull-in time, particularly when receiving a frequency-division multiplexed signal with need a for channel switching, places a severe restriction on operation of the system.

SUMMARY OF THE INVENTION

It is the principal object of the present invention to provide an optical frequency acquisition apparatus for an optical coherent communication system permitting quickly making a distinction between the real and image bands.

According to the present invention, there is provided an optical frequency acquisition apparatus for an optical coherent communication system, each of the image and real bands of said apparatus having one stable AFC operation point, comprising:

a local optical oscillator responsive to an injection current and adapted for producing a local oscillation light;

IF-band signal producing means responsive to an optical input signal and the local oscillation light and adapted for producing an IF signal;

a frequency discriminator for discriminating the frequency of the IF signal; and a controller for controlling an amount of injection current based on a frequency discriminator output, the controller starting the AFC operation feeding the injection current dependent on the dc component of the frequency discriminator output to the local optical oscillator after feeding an initial injection current, and operating in the following three steps of (a), (b) and (c):

(a) the first step for feeding a predetermined current value for each channel as the initial current value to the local optical oscillator to perform the AFC operation, and storing the injection current value $i_o$ at the time when the frequency discriminator output reaches almost zero;

(b) the second step for changing the injection current value to $(i_o+\Delta i)$ and measuring the dc component $\Delta V$ of the frequency discriminator output; and (c) the third step for restarting the AFC operation using $i_o$ as the initial injection current if the absolute value of the dc component $\Delta V$ exceeds a predetermined value, and otherwise using $(i_o+\Delta I)$ wherein $\Delta I$ is an injection current change needed for the shift of the AFC operation of the apparatus from the stable AFC operation point in the image band to that in said read band.

DESCRIPTION OF THE PREFERRED EMBODIMENTS

The invention will be described with reference to the accompanying drawings hereinafter.

Figure 1:
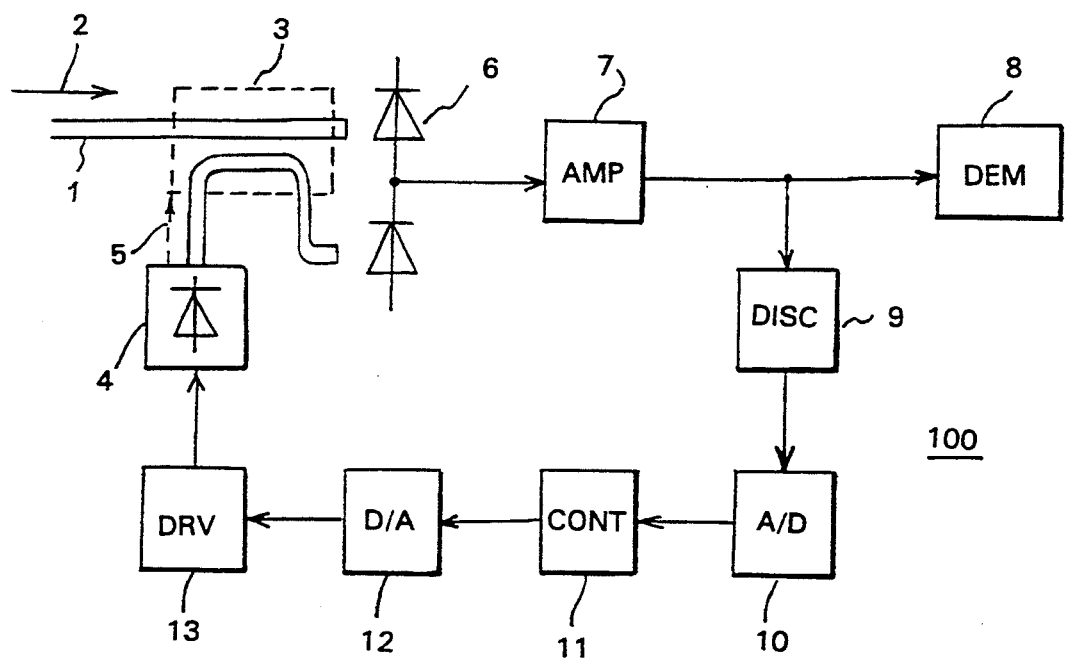
FIG. 1 is a block diagram of an embodiment of the present invention.

FIG. 1 is a block diagram of an illustrative example of the structure of a 600 Mb/s FSK (frequency shift keying) optical heterodyne receiver. A signal light 2 transmitted through an optical fiber 1 is combined with a local oscillation light 5 emitted from a laser 4 by a light coupler 3, and is detected by photo-detectors 6. The operational temperature of local oscillation laser 4 is controlled at 25° C. constantly by a temperature stabilizing mechanism (not shown).

Figure 2:
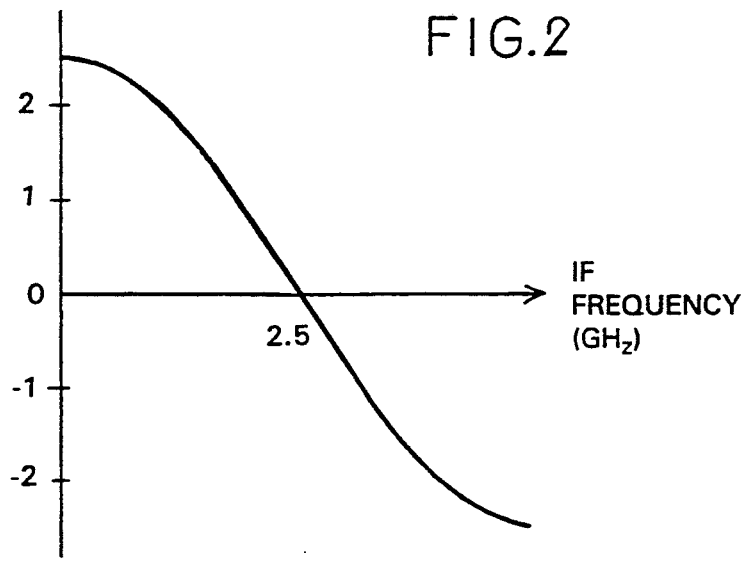
FIG. 2 shows an example of the input-IF frequency vs. output voltage characteristic of the frequency discriminator.
Figure 3:
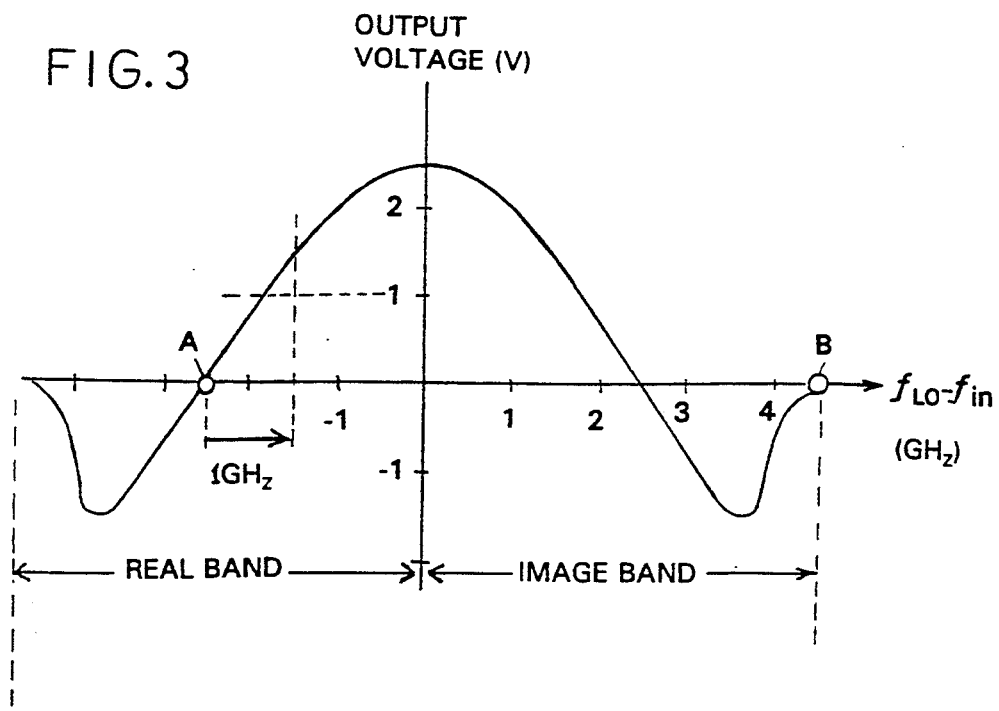
FIG. 3 shows the frequency difference between a signal light frequency and a local oscillation light frequency vs. output voltage characteristic of the frequency discriminator.

The photo-detectors 6 output an IF electrical signal which is amplified in an IF amplifier 7 and is provided to a demodulator (DEM) 8 and a frequency discriminator (DISC) 9. Frequency discriminator 9 has a discrimination characteristic which a right-falling zero-crossing point at 2.5 GHz as shown in FIG. 2. In FIG. 3 there are two stable AFC operation points "A" and "B" each in the real and image bands, respectively. A demodulator 8 extracts the 600 Mb/s baseband signal from the IF signal by dual filter detection and is adjusted to normally operate at point "A" in FIG. 3. Frequency discriminator 9 outputs a voltage signal through an analog-digital converter (A/D) 10 to a controller (CONT) 11 which controls the injection current to local oscillation laser 4 through a digital-analog converter (D/A) 12 and a current driver (DRV) 13 which contributes to setting the frequency of local oscillation light 5.

Figure 4:
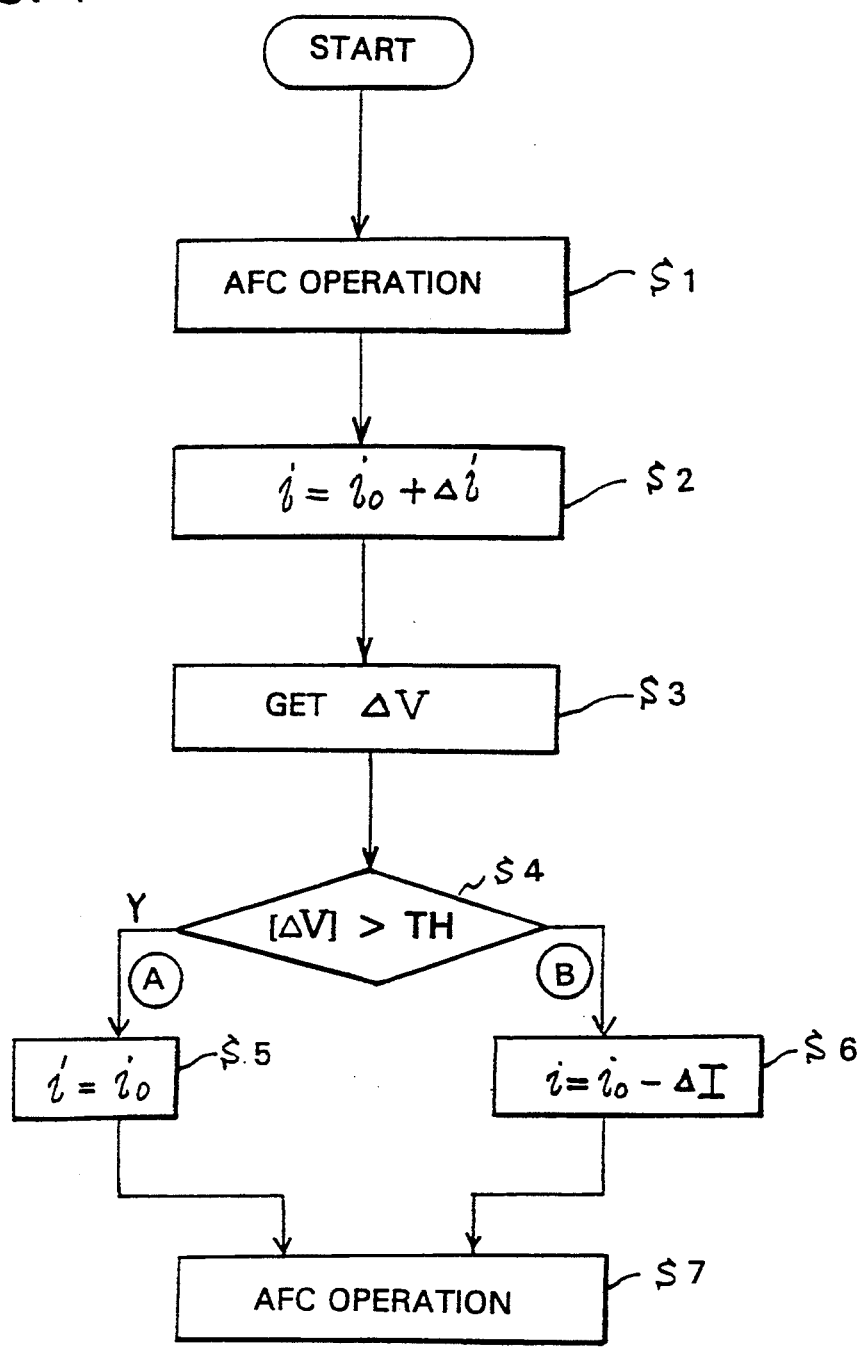
FIG. 4 is a flow chart for illustrating the operation of controller 11 in the first embodiment of the present invention.

Additionally referring to FIG. 4, the operation of controller 11 will be set forth. Controller 11 consists, for example, of a microcomputer, and operates as shown in the flow chart of FIG. 4.

Once receiver 100 is turned on, or switching to any channel to be used is caused, controller 11 supplies the corresponding initial current value $I_o(\lambda)$ stored therein to the channel to current driver 13 which feeds an injection current to the local oscillation laser, and thereby causes receiver 100 to make the AFC operation (step S1). As well-known, this AFC operation will be performed as follows.

Now assume that as a local oscillation laser oscillator is used such that it has a characteristic of having higher frequency (or the shorter wavelength) with increasing injection current. During this AFC operation in step S1, controller 11, when the output-voltage dc component of frequency discriminator 9 of which the characteristic is plotted in FIG. 3 is positive, reduces the injection current value to lower the oscillation frequency ($f_{Lo}$) of local oscillation laser 4, and when negative, increases the injection current to increase the oscillation frequency ($f_{Lo}$). When the output voltage of frequency discriminator 9 becomes about zero under the above-mentioned AFC operation, controller 11 stores the injection current value $i_o$ fed to the local oscillation laser at this time, and receiver 100 stays at stable AFC operation point either "A" or "B" in FIG. 3.

In step S2, controller 11 adds a predetermined current value $\Delta i$, which is enough to increase the oscillation frequency of the local oscillation laser by the predetermined value, to current value $i_o$, the resultant injection current $i = i_o + \Delta i$ being fed to local oscillation laser 4. In the next step S3, controller 11 measures the increased output voltage $\Delta V$ of the frequency discriminator due to the added injection current value $\Delta i$. In step S4, controller 11 checks whether or not the output voltage change $|\Delta V|$ of the frequency discriminator is larger than the predetermined voltage value TH. If $|\Delta V| > TH$, the operation of the controller 11 transfers to step S5, and if not so, to step S6.

Decision of $|\Delta V| > TH$ in step S4 means that under the AFC operation in step S1 receiver 100 stays at stable AFC point "A" shown in FIG. 3 while decision of $\Delta V \leq TH$, if the same except for this, means it stays at the other stable AFC point B. In the example of FIG. 3, TH = 1.0 V, and the oscillation frequency increase of the local oscillation laser due to injection current increase $\Delta i$ is set to 1.0 GHz. In step S5, injection current "i" to local oscillation laser 4 is returned to $i_o$.

The operation of controller 11 transfers to the next step S7, and the AFC operation restarts and rapidly converges because it starts at near stable point A. When pulled, in step S1, into the real band by the operations of steps S1 through S5 and S7, receiver 100 continues to operate in the real band.

In step S6, controller 11 adds a current value $(-\Delta I)$ enough to shift the local oscillation frequency $f_{Lo}$ from stable point "B" to stable point "A" to $i_o$, and causes current driver 13 to feed the resultant injection current $(i_o - \Delta I)$ to the local oscillation laser 4, resulting in the shift of the IF frequency to near stable point A. The AFC operation resumes in step S7.

According to the first embodiment described above, the time required from turn-on to when the AFC operation has converged in step S7 was measured in 20 runs to get an average value of 9.2 msec while according to the process described in U.S. Pat. No. 5,046,140, it took 122 msec for the pull-in at the stable point in the real band.

Figure 5:
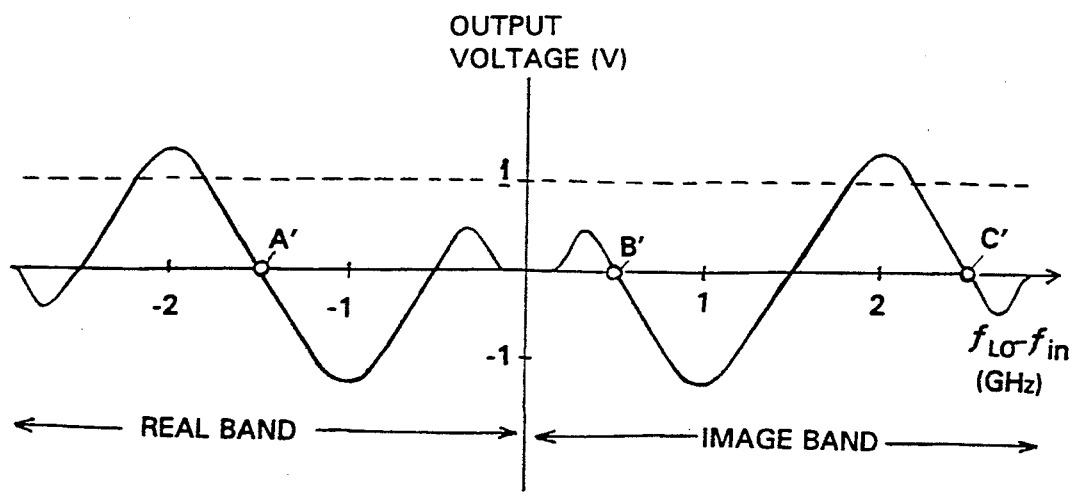
FIG. 5 shows the input IF frequency vs. output voltage characteristic of the frequency discriminator in the second embodiment of the present invention.

The first embodiment was described by the example of setting AFC operation center at the zero-crossing point "A" in the right-rising part of the characteristic of ($f_{Lo} - f_{in}$) vs. output voltage. According to the present invention, also a frequency discriminator which has such characteristic of ($f_{Lo} - f_{in}$) vs. output voltage as shown in FIG. 5 can be used. An alternative (the second) embodiment in which the present invention is applied to a frequency discriminator having the characteristic of FIG. 5 will be described below with reference to FIGS. 5 and 6.

The example of FIG. 5 will be set forth assuming setting the AFC operation center to point "A'". In this case there are AFC operation points "B'38 and "C'" in the image band. In this embodiment of FIG. 5, because of setting at the zero-crossing point in the right-falling part of the ($f_{Lo} - f_{in}$) vs. output voltage characteristic, the AFC operation of controller 11 is made as follows: when the output of the frequency discriminator is positive, the injection current increases and thereby the oscillation frequency of the local oscillation laser increases and when negative, vice versa.

Figure 6:
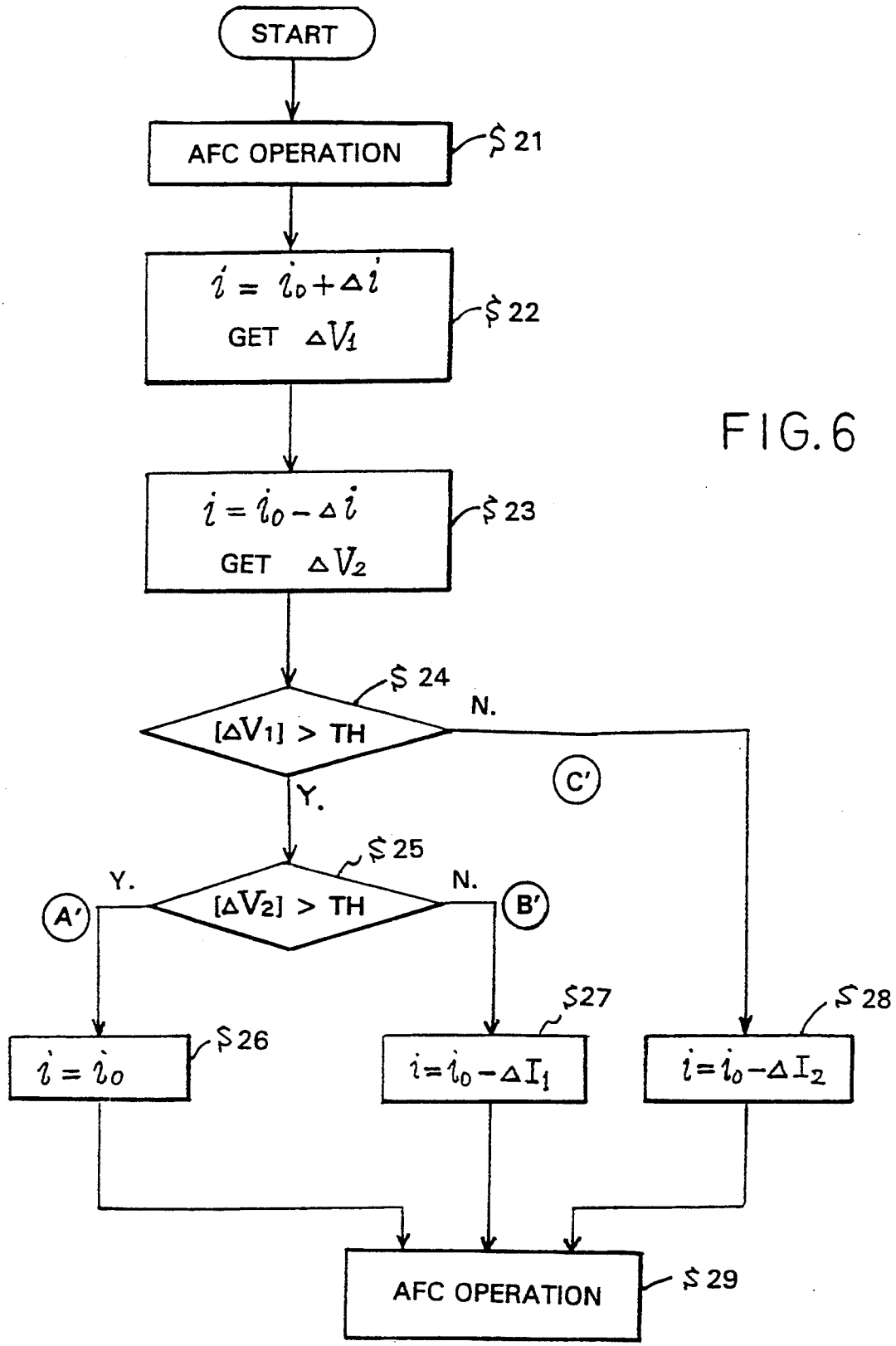
FIG. 6 is a flow chart for illustrating the operation of controller 11 in the second embodiment of the present invention.

Referring to FIG. 6, the operation of controller 11 in the second embodiment of the present invention will be described.

First, in step S21, controller 11 causes current driver 13 to feed initial current value $I_o(\lambda)$ stored therein corresponding to a desired channel to the local oscillation laser, and in response to this, receiver 100 performs the AFC operation. Once the output of the frequency discriminator reaches approximately zero V, controller 11 stores the injection current value $i_o$ to the local oscillation laser 4.

In the next step S22, controller 11 adds a certain current value $\Delta i$ enough to increase the oscillation frequency of the local oscillation laser 4 by the predetermined value to current value $i_o$, and causes current driver 13 to feed the added injection current $i = i_o + \Delta i$ to local oscillation laser 4. Then controller 11 measures, and stores, the output voltage Change $\Delta V_1$ of the frequency discriminator 9 due to the injection-current increase $\Delta i$.

In step S23, the injection current value to the local oscillation laser is caused to change from $i_o$ to $i_o - \Delta i$, and the thereby-changed $\Delta V_2$ of output voltage of the frequency discriminator due to the injection current decrease $(-\Delta i)$ is measured and stored.

In step S24, $|\Delta V_1|$ is compared with the predetermined voltage TH. If $|\Delta V_1| > TH$, the operation of controller 11 transfers to step S25, and if $|\Delta V_1| \leq TH$, the operation to step S28. In the example of FIG. 5 the increase of local oscillation frequency associated with injection current-increase $\Delta i$ is set to 0.5 GHz, and TH to 1.0 V.

As apparent from FIG. 5, even if oscillation frequency $f_{Lo}$ is increased by 0.5 GHz, $|\Delta V_1|$ can not be smaller than TH (=1.0 V) except in the case where the receiver 100 stays at stable point C'. Shift of the AFC operation center from this stable point C' to stable point A' is allowed by 4.0 GHz decrease of $f_{Lo}$. In step S28 therefore controller 11 adds a current value $(-\Delta I_2)$ enough to reduce the oscillation frequency by 4 GHz to current value $i_o$, the resultant current value $(i_o - \Delta I_2)$ being fed as the AFC initial-value current to the local oscillation laser, and in the next step S29 the AFC operation restarts.

In step S25, controller 11 compares $|\Delta V_2|$ with TH. If $|\Delta V_2| > TH$, the operation transfers to step S26, and if not so, to step S27.

In step S26, the injection current value is set again to $i_o$ and fed as the AFC initial current to local oscillation laser 4, and then controller 11 accomplishes the AFC operation in step S29. The transfer of operation of controller 11 to step S26 means $|\Delta V_1| > TH$ and $|\Delta V_2| > TH$. As appears from FIG. 5, these two conditions can not be met except in the case where the receiver 100 stays at stable point A' in step S21. In step S26 therefore the injection current to the local oscillation laser is returned to $i_o$.

Transfer of the operation of controller 11 to step S27 is made in the case where receiver 100 stays at stable point B' in step S21. In this case, 2 GHz-decrease in local oscillation frequency $f_{Lo}$ results in the shift of the AFC operation center to point A'. For this reason, in step S27, controller 11 adds a current value $(-\Delta I_1)$ enough to reduce the local oscillation frequency $f_{Lo}$ by 2 GHz to current value $i_o$, the resultant current value $(i_o - \Delta I_1)$ being fed as the AFC operation initial-value current to the local oscillation laser.

In this way, in the second embodiment the operation of the receiver stays at a desired stable AFC operation point A'.

As described above, the present invention permits, even if the frequency discriminator used for the AFC operation has a plurality of stable points each in the real or image bands, respectively, the rapid, exact pull-in of the intermediate frequency into a stable point in the real band without needing a sweep of the local oscillation frequency over the whole band including the real or image bands as in the conventional method.

What is claimed is:

1. An optical frequency acquisition apparatus for an optical coherent communication system, the apparatus having image and real bands each having one stable AFC operation point, the apparatus comprising:
   a local optical oscillator responsive to an injection current and adapted for producing a local oscillation light;
   IF-band signal producing means responsive to an optical input signal and said local oscillation light and adapted for producing an IF band signal;
   a frequency discriminator for discriminating said frequency of said IF signal and providing an output having a dc component $\Delta V$; and
   a controller for controlling an amount of injection current produced and fed to said local optical oscillator based on the output of the frequency discriminator, said controller comprising means for starting an AFC operation by feeding said injection current dependent on said dc component of said output of the frequency discriminator to said local optical oscillator after feeding an initial injection current, said controller further comprising means for:
   (a) feeding a predetermined current value as said initial current value to said local optical oscillator to perform said AFC operation, and storing an injection current value $i_o$ at a time when said frequency discriminator output reaches almost zero;
   (b) changing said injection current value to $(i_o + \Delta i)$, where $\Delta i$ is a constant current value, and measuring the dc component $\Delta V$ of said frequency discriminator output; and
   (c) restarting said AFC operation using $i_o$ as said initial injection current if the absolute value of said dc component $\Delta V$ exceeds a predetermined value TH, and otherwise using $(i_o - \Delta i)$ wherein $\Delta I$ is an injection current change needed to shift the operation of said apparatus from said stable AFC operation point in said image band to the stable AFC operation point in said real band.

2. An optical frequency acquisition apparatus for an optical coherent communication system, the apparatus having image and real bands, the real band having one AFC operation point and the image band having first and second stable AFC operation points, the apparatus comprising:
   a local optical oscillator responsive to an injection current and adapted for producing a local oscillation light;
   IF-band signal producing means responsive to an optical input signal and said local oscillation light and adapted for producing an IF-band signal;
   a frequency discriminator for discriminating said frequency of said IF signal and providing an output having a DC component $\Delta V$; and
   a controller for controlling an amount of injection current produced and fed to said local optical oscillator based on the output of the frequency discriminator, said controller comprising means for starting an AFC operation by feeding said injection current dependent on said DC component of said output of the frequency discriminator to said local optical oscillator after feeding an initial injection current, said controller further comprising means for
   (a) feeding a predetermined current value as said initial current value to said local optical oscillator to perform said AFC operation, and storing said injection current value $i_o$ at a time when said frequency discriminator output reaches almost 0;
   (b) changing said injection current value to $(i_o + \Delta i)$ and $(i_o - \Delta i)$, respectively, and measuring dc components $\Delta V_1$ and $\Delta V_2$, of said frequency discriminator outputs, respectively; and (c) restarting said AFC operation using $i_o$ as said initial injection current if respective absolute values of said dc component $\Delta V_1$ and $\Delta V_2$ both exceed a predetermined value TH, using $(i_o - \Delta I_1)$ if $|\Delta V_1| > TH$ and $|\Delta V_2| < TH$, and using $(i_o - \Delta I_2)$ if $|\Delta V_1| < TH$ and $|\Delta V_2| > TH$, wherein $\Delta I_1$ is an injection current change needed to shift operation of said apparatus from said first stable AFC operation point in said image band to the AFC operation point in said real band and $\Delta I_2$ is an injection current change needed to shift operation of said apparatus from said second stable AFC point in said image band to the AFC operation point in said real band.

* * * * *